W. H. Horton,
Cutting and Bending Tin Ware.
N° 7,809. Patented Dec. 3, 1850.
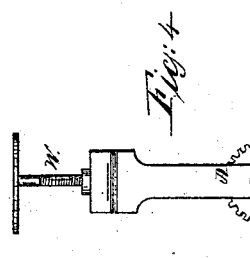
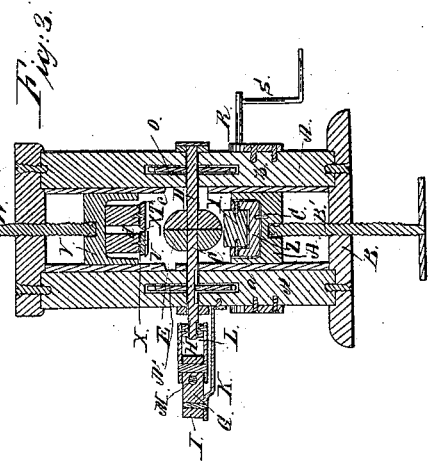
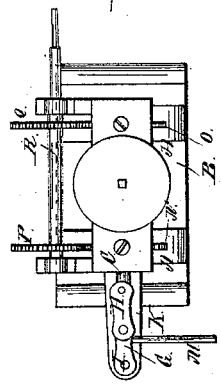
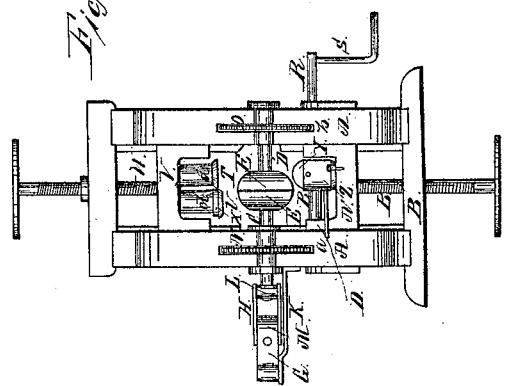

UNITED STATES PATENT OFFICE.

WM. H. HORTON, OF NEWBURYPORT, MASSACHUSETTS.

IMPROVED ARRANGEMENT OF BENDING-ROLLERS IN TIN CUTTING AND BENDING MACHINES.

Specification forming part of Letters Patent No. 7,809, dated December 3, 1850.

*To all whom it may concern:*

Be it known that I, WM. H. HORTON, of Newburyport, in the county of Essex and State of Massachusetts, have invented a new and useful or Improved Machine for Cutting and Bending Tin-Plate or other Sheet Material; and I do hereby declare that the same is fully described and represented in the following specification and accompanying drawings, letters, figures, and references thereof.

Of the said drawings, Figure 1 denotes a top view of my said machine. Fig. 2 is a front elevation of it. Fig. 3 is a central vertical and longitudinal section of it. Fig. 4 is an end view of it.

The object of my said improved machine is to reduce a piece of tin-plate to a circular form, and at the same time, if necessary, to bend or turn down the edge of it at a right angle with the remainder, and thus to convert the said piece of tin-plate into a box-cover or other article of similar character.

A in the said drawings represents a strong vertical frame resting on a base or table, B, and made of suitable material and proportions for sustaining the operative mechanism connected to it. C and D are two horizontal shafts or arbors, placed with their axes in exact line with each other, and having their respective bearings in the two upright posts $a\,b$ of the frame A. A circular head, E or F, is fixed on the inner end of each of the said shafts, the inner faces of such two circular heads being plane surfaces; or one may be made concave, while the other is made convex in conformity, or thereabout, to it. While the shaft D should be supported in its bearing in such manner as to be capable of no movement except a transverse revolution, the other shaft, C, should be so sustained by its bearing as to not only allow of a transverse revolution of the shaft, but a longitudinal or endwise movement of it, either toward or away from the shaft D, the same being produced by toggle-joints G H. One of the said toggle-joints—viz., G—is made to turn on a pin, I, which projects upward from an arm, K, extended from the main frame. The other toggle is jointed to a box or bearing, L, in which the end of the shaft C revolves, and which is so fixed to the shaft as to cause it to move in a longitudinal direction whenever the toggle-joints are moved toward or out of line with each other. A lever, M, projects from the toggle G, the same being for the purpose of enabling a person to operate the toggles. Each of the shafts C D has a gear-wheel, N or O, placed on it, the said gears being so applied to their respective shafts that while both, when rotated, produce a rotary motion of each shaft, one of them—viz., the gear N—will permit the endwise motion of the shaft C, or, in other words, the shaft to slide through it. The two gears N O are both of the same diameter, and they are made to engage, respectively, with two such gears, P Q, mounted on a shaft, R, which may be put in revolution by power applied to a crank, S, fixed on one end of it, the whole being arranged as seen in the drawings. A piece of tin-plate to be operated on is placed between the two heads E and F and confined in place by straightening the toggles or bringing them into line with each other, and so as to cause one of the heads to press the plate firmly against the other. It will be seen that we could dispense with one of the gears N O and the gear P or Q with which it engages, and by the others produce a rotary motion of the two shafts C D during the time the shaft R might be put in revolution. In fact, such a method of operating the two shafts—viz., the application of rotating power to but one of them—is common in some machines of this character, and particularly in that patented by Andrew Tracy on the 17th day of July, 1841. Such an application of the power is, however, attended with a difficulty in practice, the same consisting in a stoppage of the plate and sliding of one of the holding-heads on it, the friction oftentimes not being sufficient to carry the plate around. By causing the power which rotates the tin-plate to be transmitted from the shaft R through two trains of gears, N P O Q, applied to the three shafts C, D, and R, as hereinabove described, I obtain in practice a much better hold of the plate and more certainty of its revolution than I otherwise can. Over the holder heads or jaws E F the rotary cutters or shears T U are arranged, they being affixed to a sliding frame, V, which is made capable of being elevated or depressed by a screw, W. Each cutter consists of a horizontal wheel made to freely revolve on a vertical axle $c$ or $d$. The two cutters T U are frusta of cones, arranged with their bases in contact, and so that the sharp edge of one shall lap a little over or beyond that of the other, as seen in the drawings. The lower cutter, V, has a cylindrical or other proper-shaped guard or wheel, X, fixed to its upper side and made to rotate with it, the object of this guard being to operate in connection with the conic surface of the wheel T, and to give to the shaving or refuse piece removed by the cutters such a direction as to prevent it from straining or warping the tin below the shears or cutters. If the refuse piece of tin is not kept in the plane of the rest of the tin at or near the place of action of the cutters, it is apt to sway over upon the cutters, so as to be liable to strain or warp the tin below it. Underneath the holders I place a cylinder or roller, Y, which is supported by and revolves freely in a frame, Z, which in its turn is supported by another frame, A', that slides freely up or down within the main frame, and is raised or lowered by a screw, B'. The frame Z is made to turn horizontally—that is to say, in a plane parallel to the axes of the shafts C D—on a pivot or pin, C', arranged near one end and out of center of it, as seen in Fig. 3. A hand-lever, D', projects from the frame Z, and so as to enable a person to turn the said frame and its roller Y, around from a position in which the axis of the roller may be at right angles to that of either or both the shafts C D, into one in which it shall be parallel to the same, the top edge of the roller in the meanwhile being moved in a plane parallel to the common axes of the shafts C D. Such a removement while the two shafts C D are in revolution will gradually carry the curved surface of the roller Y against the tin, which projects beyond the holders, and bend it down at an angle to that between the holders, which angle may be a right or obtuse angle, according to the extent of movement of the roller-frame Z.

Having thus described my improved machine, I wish it distinctly understood that I do not limit my invention to the precise form and proportions of the parts as exhibited in in the drawings, but intend to vary the same as circumstances may require, so long as I do not change the principle or parts claimed by me.

I claim—

To so confine and arrange the roller Y with respect to the jaws E F (as specified) as to enable the said roller to be operated in the manner substantially as set forth—that is to say, to be moved in a plane parallel to the common axis of the shafts C D—the said roller being arranged in a turning-frame, Z, and supported by a movable and adjusting frame, A', and the object of my improvement being to enable a person to move the roller against the tin in manner and for the purpose of bending it down, substantially as hereinbefore explained.

In testimony whereof I have hereto set my signature this 7th day of August, A. D. 1850.

WM. H. HORTON.

Witnesses:
 DANIEL NORTON,
 WM. STOVER.